(12) United States Patent
Peet

(10) Patent No.: US 6,706,377 B2
(45) Date of Patent: Mar. 16, 2004

(54) SEALABLE FILM

(75) Inventor: Robert G. Peet, Pittsford, NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 121 days.

(21) Appl. No.: 10/044,022

(22) Filed: Jan. 11, 2002

(65) Prior Publication Data

US 2003/0134159 A1 Jul. 17, 2003

(51) Int. Cl.[7] .............................. B32B 7/00; B32B 7/02; B32B 27/08; B32B 27/30; B32B 27/32
(52) U.S. Cl. .................. 428/212; 428/35.7; 428/36.6; 428/217; 428/343; 428/346; 428/347; 428/349; 428/355 EN; 428/355 AC; 428/515; 428/516; 428/518; 428/520; 428/522; 428/523
(58) Field of Search ......................... 428/35.7, 36.6, 428/212, 217, 343, 346, 347, 349, 355 EN, 515, 516, 518, 520, 522, 523, 355 AC

(56) References Cited

U.S. PATENT DOCUMENTS

| | | | | |
|---|---|---|---|---|
| 4,937,139 A | * | 6/1990 | Genske et al. | 428/349 |
| 5,061,532 A | * | 10/1991 | Yamada | 428/35.7 |
| 5,160,767 A | * | 11/1992 | Genske et al. | 428/35.9 |
| 5,358,792 A | | 10/1994 | Mehta et al. | 428/516 |
| 5,500,265 A | * | 3/1996 | Ambroise et al. | 428/41.3 |
| 5,689,935 A | * | 11/1997 | Derkach et al. | 53/412 |
| 5,716,698 A | * | 2/1998 | Schreck et al. | 428/323 |
| 5,773,136 A | * | 6/1998 | Alder et al. | 428/317.3 |
| 5,997,968 A | * | 12/1999 | Dries et al. | 428/35.7 |
| 6,231,975 B1 | | 5/2001 | Kong et al. | 428/355 |
| 6,451,426 B2 | * | 9/2002 | Kong et al. | 428/355 EN |

FOREIGN PATENT DOCUMENTS

| WO | WO9604178 | | 2/1996 |
|---|---|---|---|
| WO | WO 98/32596 | * | 7/1998 |

* cited by examiner

*Primary Examiner*—Vivian Chen
(74) *Attorney, Agent, or Firm*—Rick F. James

(57) ABSTRACT

A sealable film comprising a core layer comprising an olefin polymer wherein the core layer comprises the interior of the film; a separable layer exterior to the core layer, wherein the separable layer comprises a material or blend selected from the group consisting of impact copolymers; thermoplastic polyolefins; blends of impact copolymers and LLDPE's; blends of two or more incompatible polymers; and mixtures thereof; an optic improving layer exterior to the core layer and the separable layer, wherein the optic improving layer comprises a polymer having at least one of modulus, hardness, and/or beam strength being higher than the material of the separable layer; and a sealing layer exterior to the core layer, the separable layer, and the optic improving layer, wherein the sealing layer comprises a polymer.

20 Claims, 1 Drawing Sheet

SEALABLE FILM

FIELD OF THE INVENTION

The invention relates to a thermoplastic film which is peelable and sealable. More specifically, the invention relates to a thermoplastic film with intermediate separable layers sandwiched between a core layer and a sealing layer which permits peeling of the core layer from the seal layer. The film also provides improved optical clarity.

BACKGROUND OF THE INVENTION

A peelable film structure is described in WO 96/04178 published on Feb. 15, 1996. The film structure comprises a core layer comprising an olefin polymer and a heat sealing layer comprising a blend of low density polyethylene (LDPE) and a material incompatible with the LDPE, such as an olefin polymer or co- or terpolymer of ethylene, propylene or butene. The film structure can be heat sealed to a plastic container to form the lid of the container, or to itself to form a package. It is disclosed that when used with a plastic container, the film structure can be readily peeled from the container in order to open it.

In U.S. Pat. No. 5,358,792 a heat sealable composition is described comprising (a) from about 30 to about 70 weight percent of a low melting polymer comprising a very low density ethylene based copolymer defined by a density in the range of about 0.88 g/cm$^3$ to about 0.915 g/cm$^3$, a melt index in the range of about 1.5 dg/min to about 7.5 dg/min, a molecular weight distribution ($M_w/M_n$) no greater than about 3.5 and (b) from about 70 to about 30 weight percent of a propylene based polymer. U.S. Pat. No. 5,358,792 is incorporated herein by reference in its entirety.

U.S. Pat. No. 6,231,975, issued May 15, 2001, discloses an oriented sealable film comprising: (a) a core layer comprising an olefin polymer which comprises polypropylene, high density polyethylene or ethylene-propylene copolymer or terpolymer, wherein the polypropylene comprises greater than about 80 wt % of isotactic polypropylene or greater than about 80 wt % of syndiotactic polypropylene, wherein the percentages are based on the entire weight of the polypropylene of the core layer; (b) a sealing layer selected from the group consisting of ethylene-propylene random copolymer, ethylene-butene-1 copolymer, ethylene-propylene-butene-1 terpolymer, propylene-butene copolymer, low density polyethylene, linear low density polyethylene, very low density polyethylene, metallocene catalyzed polyethylene plastomer, metallocene catalyzed polyethylene, metallocene catalyzed ethylene-hexene copolymer, metallocene catalyzed ethylene-butene copolymer, metallocene catalyzed ethylene-octene copolymer, ethylene-methacrylate copolymer, ethylene-vinyl acetate copolymer and ionomer resin; and (c) a separable layer positioned between the core layer and the sealing layer, the separable layer comprising a blend of linear low density polyethylene and ethylene-propylene block copolymer.

SUMMARY OF THE INVENTION

This invention relates to a sealable film comprising:
(a) a core layer comprising an olefin polymer wherein the core layer comprises the interior of the film;
(b) a separable layer exterior to the core layer, wherein the separable layer comprises (1) an impact copolymer layer; (2) a thermoplastic polyolefin (TPO) layer; (3) a blend of impact copolymer and LLDPE; or (4) a blend of two or more incompatible polymers;
(c) an optic improving layer exterior to the core layer and the separable layer, wherein the optic improving layer comprises a polymer having an optic improving level of modulus, hardness, and/or beam strength; and
(d) a sealing layer exterior to the core layer, the separable layer, and the optic improving layer, wherein the sealing layer comprises a polymer.

Objects and advantages of the invention include one or more of the following:

To provide a thermoplastic film having at least four layers, including a seal layer, which is sealable to itself and other surfaces, but which permits separation of the seal layer from at least one other layer of the film.

To provide a thermoplastic film having one or more separable layers positioned to permit separation of the sealing layer from at least one other layer of the film.

To provide a multilayer film comprising a core layer and a sealing layer, so that when sealed to itself, or another surface, the sealing layer can be separated from the other layers of the film.

To provide a thermoplastic film suited for packaging applications.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of several illustrative embodiments when read in conjunction with the accompanying drawings, wherein:

DETAILED DESCRIPTION OF THE INVENTION

Figure 1:
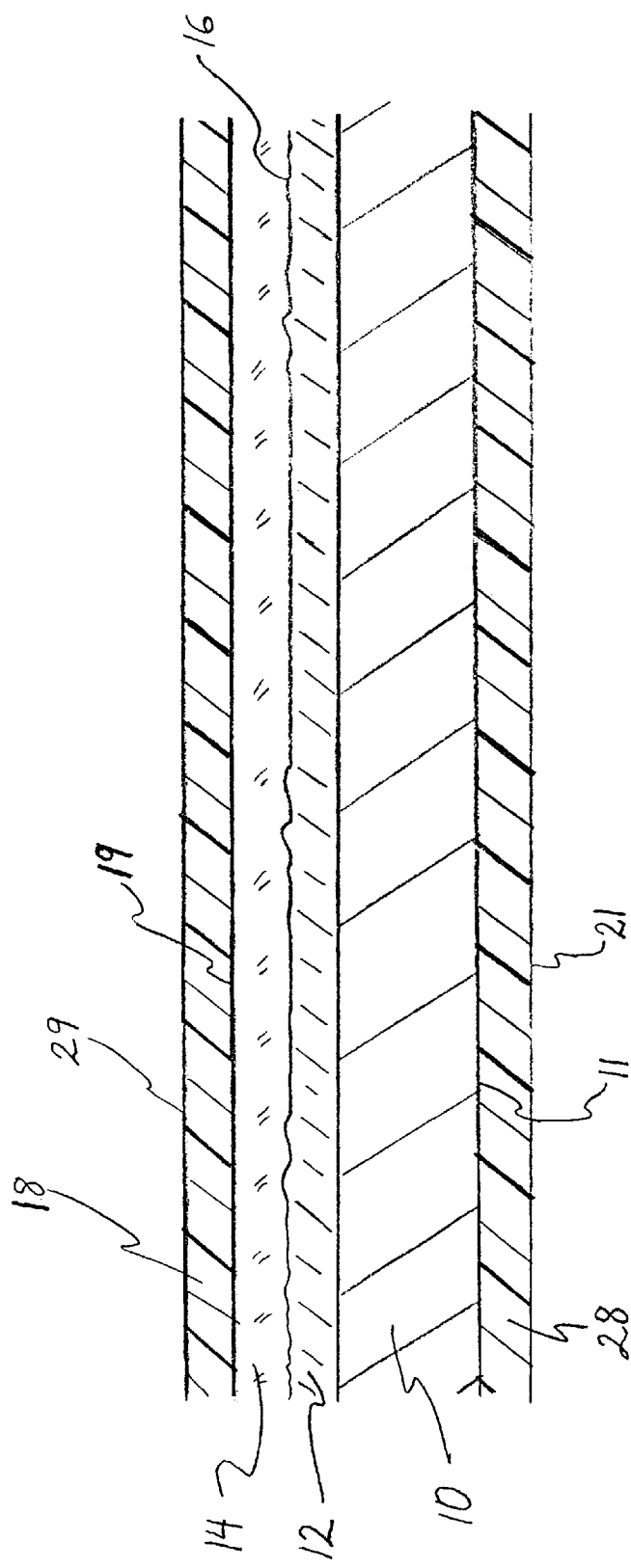
FIG. 1 is a cross sectional view of a multi-layered layered film.

The invention relates to a sealable film comprising
(a) a core layer comprising an olefin polymer wherein the core layer comprises the interior of the film;
(b) a separable layer exterior to the core layer, wherein the separable layer comprises (1) an impact copolymer layer; (2) a thermoplastic polyolefin (TPO) layer; (3) a blend of impact copolymer and LLDPE; or (4) a blend of two or more incompatible polymers;
(c) an optic improving layer exterior to both the core layer and the separable layer, wherein the optic improving layer comprises a polymer having a level of modulus, hardness, and/or beam strength suitable for creating improved film optics. Suitable polymers include polypropylene (PP), polyethylene (PE), the olefin polymer of the core layer, or any polymer with sufficient modulus, hardness, and/or beam strength to improve the optics of the film. The polymer can be produced by any catalytic technique known in the art, e.g. Ziegler-Natta catalysis, metallocene catalysis, etc.; and
(d) a sealing layer, typically a skin layer, and typically exterior to all of the core layer, the separable layer, and the optic improving layer.

The terms "exterior" and "interior" may be used herein for positional-relationship purposes, as opposed to interior and exterior regions of a package. It will also be understood that an arrangement of layers on one side of the core layer 10 may also be provided on the opposite side of the core layer 10, providing a film having substantially mirror-image arrangements of layers on each side of the core layer 10.

FIG. 1 is a cross sectional view of one embodiment of a sealable film of the invention comprising a five layered film 40, including, in addition to the four layers described in the preceding paragraph, an optional sealing layer 28. Optional sealing layer 28 may be in addition to seal layer 18. The film 40 comprises a first surface 21, a core layer 10, an interior interface 11, a separable layer 12, an optic improving layer 14, a sealing layer 18, an interior interface 19, and a second surface 29.

The inclusion of a separable layer 12 between a core layer 10 and a sealing layer 18 provides a sealable film 40 which permits peeling of the core layer 10 from the sealing layer 18 or the optic improving layer 14, without substantially destroying either the core layer 10, the sealing layer 18, or the optic improving layer 14.

The separable layer 12 comprises, typically, materials which provide a relatively weak adhesive bond between either or both of the core layer 10 on one side of the separable layer and an optic improving layer on the opposite side of the separable layer, such as the optic improving layer 14. A stress applied to open or unseal sealed film 40 may result in fracturing the weak bonds between materials adjacent the separable layer and the separable layer, resulting in separation at the separable layer 12, but without further destruction or fracturing of the sealing 18 or the core 10 layers.

In another embodiment, the separable layer 12 has less cohesive strength than either the optic improving layer 14, the sealing layer 18, or the core layer 10, which causes the separable layer 12 to fail before either the sealing layer 18 or the core layer 10 when an opening stress is applied to the inventive film which has been sealed to itself.

The separable layer 12 comprises a peel material. The term "peel material" is used herein to cover the class of film layer forming materials included in the separable layer 12 that allow the sealing layer 18 and inner layer 10 of a composite film to be separated from each other under stress as essentially integral layers.

The sealed film can be separated by causing the separable layer 12 to lose its integrity without substantially impacting the integrity of either the sealing layer 18 or the core layer 10. Thereby the film may be made both "sealable" and "peelable."

The sealing layer(s) 18 and/or 28 may be coated on surfaces 29 and/or 21, respectively, with a sealable coating that facilitates sealing of the film to itself or to another film surface. Sealing layer 18 can be applied to surface 19 by coating techniques instead of by coextrusion, if so desired. Such coating may be a heat sealable coating. Examples of the heat sealable coatings include acrylic, ethylene-acrylic acid copolymer, or polyvinylidene chloride.

In one embodiment, the peel material of the separable layer 12 comprises at least one olefin polymer. Examples of the peel material include those olefin polymers selected from the group consisting of impact copolymers, TPO's, and blends thereof.

In another embodiment, the peel material comprises a blend of an impact copolymer, block copolymer, or TPO and an incompatible polymer.

In another embodiment, the peel material comprises a blend of two or more incompatible polymers or a blend of various kinds of polyethylene and another olefin which forms an incompatible blend or mixture with the polyethylene, specifically either (i) a polypropylene homopolymer or (ii) an ethylene-propylene block copolymer. Typically, the polyethylene (PE) is selected from the group consisting of low density polyethylene (LDPE), high density polyethylene (HDPE), linear low density polyethylene (LLDPE), medium density polyethylene (MDPE), metallocene-catalyzed versions of these polyethylenes and blends thereof. The term polyethylene may include homo-, co- or terpolymers which include ethylene.

In another embodiment, the peel material comprises a blend of an impact copolymer or TPO and LLDPE.

In one embodiment, the impact copolymer or TPO comprises a laminar arrangement of a rubber phase within a polypropylene matrix. A specific example of a commercially available material that may comprise the peel material of the separable layer 12 is a TPO/impact copolymer sold by Chisso as Newcon NF-2106.

Incompatible blend is defined herein as two or more polymers that solidify into two or more separate phases on solidification from a melt.

When the separable layer 12 comprises a TPO/impact-copolymer/block copolymer, the copolymer may comprise from about 5% to about 50% ethylene (for example about 10–20%, or about 15%), and from about 50% to about 95% propylene (for example about 80–90%, or about 85%). The term "block" copolymer is used in the ordinary sense meaning a polymer whose molecule is made up of alternating sections of ethylene or polyethylene separated by sections of a different olefin such as propylene or polypropylene.

When an impact copolymer/TPO/block copolymer is used as a separable layer in a film structure, it is well known in the art that such film structures typically produce an undesirable haze level and gloss is worsened. The optical properties of a film providing a separable layer positioned between a core layer and a sealing layer may result in an unacceptably high haze, due at least partially, to a relatively irregular surface on an exterior side of the separable layer. By placing a higher modulus, higher hardness, and/or higher beam strength polymer layer between the separable layer 12 comprising an impact copolymer/TPO/block copolymer and the sealing layer 18, the haze generating and gloss deteriorating tendencies are significantly overcome. Providing in the film structure, a polymer layer having at least one of modulus, hardness, and/or beam strength being higher than the corresponding property of the separable layer, and positioning that polymer layer, an optic improving layer 14, adjacent the separable layer has been shown to improve the optical clarity of the film structure.

The optic improving layer 14 comprises a polymer having a higher modulus, hardness, and/or beam strength than the material(s) of the separable layer 12. In one embodiment, the layer comprises a homopolymer derived from an alpha-olefin. Suitable alpha-olefins that may be polymerized for the optic improving layer include ethylene, propylene, butene, and higher alpha-olefins. The homopolymer can be produced by any catalytic technique known in the art, e.g. Ziegler-Natta catalysis, metallocene catalysis, etc. In one embodiment, the polymer can comprise a copolymer of at least 99% of a first alpha-olefin, and up to about 1% of a second monomer.

In one aspect of the invention, the separable layer 12 may be a blend of two or more incompatible copolymers, such as ethylene homopolymer, copolymer or terpolymer and another olefin homopolymer, copolymer, or terpolymer. In such embodiment, the incompatible blends of the separable layer may be typically selected from, but not limited to, the group consisting of: (a) a blend of linear low density polyethylene and polypropylene, (b) a blend of high density polyethylene and polypropylene; (c) a blend of low density polyethylene and polypropylene; (d) metallocene catalyzed plastomer ethylene-hexene-butene terpolymer and polypropylene; (e) a blend of linear low density polyethylene and polypropylene copolymer such as ethylene-propylene block copolymer; (f) a blend of metallocene catalyzed polyethylene and polypropylene; and mixtures thereof. Any proportion of the two polymers is appropriate but choice of the blend proportion may be made to meet optical clarity objectives through routine experimentation.

The film structure includes a core layer 10, which may be the central or innermost part of the film structure. The core layer 10 can be a single layer or a plurality of layers. In one embodiment there is a core layer 10 and one or more intermediate layers (not shown) exterior to the core layer 10, e.g. between the core layer 10 and the separable layer 12. In other embodiments, one side of the core layer may be an exterior surface of the film structure.

In one embodiment, the core layer comprises an olefin polymer such as polypropylene or polyethylene. In another embodiment, the core layer comprises a polypropylene which is predominantly isotactic, syndiotactic or atactic. The core layer can comprise greater than about 80 wt. % of isotactic polypropylene based on the entire weight of the polypropylene of the core layer or greater than about 80 wt. % of syndiotactic polypropylene, based on the entire weight of the polypropylene of the core layer.

When the core layer comprises polyethylene, the polyethylene can be high density polyethylene. The term high density polyethylene generally includes polyethylenes ranging in density from about 0.94 to about 0.96 and over. One commercially available high density polyethylene is sold by Oxychem as "M6211".

The core layer can also comprise an ethylene co- or ter-polymer in which the remaining monomer constituent(s) is/are a $C_3$ to $C_4$ monomer such as propylene and/or butene-1.

The film structure can also include one or more intermediate layers (not shown). The intermediate layer(s) can include any olefin polymer material. The intermediate layer(s) may be exterior to the core layer 10, and may be on the same side of the core layer 10 as the separable layer 12, or may be on the opposite side. Any material used in the core layer may also be used in the intermediate layer(s). In one embodiment, an intermediate layer comprises a propylene homopolymer.

The core layer can be clear.

The sealing layer may be applied on the same side of the film as the separable layer(s), as illustrated in FIG. 1 by sealing layer 18. The materials of the sealing layer are characterized by features that permit the separable layers to separate or fail structurally when stress is applied to the film. Typical examples of materials which may be suitable for use as the sealing layer include coextrudable materials which form a seal upon application of elevated temperatures and, at least slight, pressure. Examples of thermoplastic materials which can be used for the sealing layer include olefinic homo-, co- or terpolymers. The olefinic monomers can comprise 2 to 8 carbon atoms. Specific examples include ethylene-propylene random copolymer, ethylene-butene-1 copolymer, ethylene-propylene-butene-1 terpolymer, propylene-butene copolymer, low density polyethylene, linear low density polyethylene, very low density polyethylene, metallocene-catalyzed polymers known by the term plastomer, ethylene-hexene copolymer, ethylene-butene copolymer, ethylene-octene copolymer, ethylene-methacrylic acid copolymer, ethylene-vinyl acetate copolymer and ionomer resin. A blend of the foregoing materials is also contemplated such as a blend of the plastomer and ethylene-butene copolymer.

A sealing layer 28 may also be provided, as illustrated in FIG. 1, adjacent the core layer 10, on a side of the core layer 10 opposite the separable layer 12. In such embodiment, the sealing layer 28 may be in addition to sealing layer 18, such that the film structure may be sealable on both sides of the structure. In other embodiments, sealing layer 28 may be provided in the film structure while sealing layer 18 is added in a subsequent coating step, whereby surface 19 may be an exterior surface of the film structure as initially produced.

The invention is also directed to a method of making a sealable film comprising the steps of (a) providing a core olefin layer; (b) coextruding the inner olefin layer with a separable layer and an optic improving layer; and (c) applying a sealing layer to a surface of the optic improving layer (by any means including co-extrusion, extrusion coating, and coating, etc.) This method can further comprise the step of coating the sealing layer with a coating composition selected from the group consisting of acrylic, polyvinylidene chloride, and ethylene-acrylic acid polymers.

The thickness of the separable layer can be important. In general, depending upon the materials of the separable layer, the separable layer can constitute in one embodiment at least about 5%, and in another embodiment about 10% to about 50% of the entire thickness of the film. For example, in a film of about 10 $\mu$m to about 80 $\mu$m, specifically about 15 $\mu$m to about 35 $\mu$m, and when the separable layer is, for example, one layer of impact copolymer, the separable layers could range from about 0.5 $\mu$m to about 15 $\mu$m, or it could range from about 7 $\mu$m to about 12 $\mu$m.

One or more of the layers of the film, but typically an exposed surface layer, can include a small amount of a finely divided inorganic material which can impart antiblock characteristics to the structure and reduce the coefficient of friction. Contemplated finely divided inorganic materials include synthetic amorphous silica, such as silica, diatomaceous earth and clay. An effective amount of a slip agent can be employed. A typical slip agent is selected from the group consisting of particulate crosslinked hydrocarbyl-substituted polysiloxanes.

The resins of this invention are formed into multilayer films using film forming technology that is well known to those skilled in the art. The resins are, typically cast extruded or coextruded into a film using a flat die or blown extruded or coextruded using a tubular die. The films then may be oriented either uniaxially or biaxially by known stretching techniques. The sealing layer can be applied by coextrusion or extrusion coating. In one embodiment of the invention, after orienting the film in the machine direction the sealing layer is extrusion coated onto the optic improving layer followed by orienting the film in the transverse direction.

EXAMPLES

In each of these examples, coextruded biaxially oriented films were produced using the olefinic polymer resins described below. The films were multilayer coextruded films made by melting the polymers, at a temperature ranging from about 245 to about 290° C., extruding the polymers through a slot die in sheet form and then orienting the film sequentially in the machine direction (about 3 to about 8 times, at about 110° C.) and in the transverse direction (about 5 to about 12 times, at about 160° C.).

In the examples which follow films were sealed by the sealing layer. The performance of the separable layer was tested by trying to pull the seal apart. In each of the examples the tester was able to separate the seal without severing the core or sealing layer of the film, indicating effective performance of the separable layer.

Sealability was tested on the films to confirm that the separable layer did not adversely impact sealability or seal strength. Seal strength was evaluated to determine the sealability of the film. In the examples, the minimum seal temperature was determined using a Wrap-Aide Crimp Sealer Model J or K. In the test method, the crimp sealer is set to a dial pressure of about 20 psi (138 kPa), dwell time of 0.75 seconds. A film specimen is prepared so that when two surfaces are placed together the resulting film is approximately 6.35 cm in the transverse direction by 7.62 cm in the machine direction. The specimen is then inserted squarely, smoothly and flatly into the crimp sealer jaws so that a small amount protrudes beyond the back end of the jaws. The transverse direction of the film is parallel to the sealer jaws. The jaws are closed and immediately after the sealing bar rises the specimen is removed from the jaws of the sealer. A JDC cutter is used to cut the film into a one inch strip. The amount of force needed to separate the seal is determined on an Alfred-Suter crimp seal strength testing unit. The amount of force needed to pull the seal apart is recorded in N/m. In order to determine the minimum temperature required to form a seal requiring about 77.03 N/m peel force, the crimp seals are formed at temperatures raised by 5.6 degree centigrade increments until one temperature yields a seal value of less then about 77.03 N/m and the next temperature yields a seal value of greater than or equal to about 77.03 N/m.

For packaging film applications, film without a separable layer is usually torn through to open the package, especially when the area where the film is sealed is stronger than the film. With the separable layer, the bag can be opened without tearing the core of the film because in the area where the package film is sealed to enclose the contents of the package, there is a continuous separable layer which permits the seal to be separated without film tearing. An advantage of the separable layer is that it permits ordinary seal materials to be used to seal the film so that the desired properties of a seal material, such as seal strength and hot tack, are not compromised but the film is still peelable.

Each of the test films of this example, were five layer structures having a core propylene homopolymer layer (Fina 3355Z), a separable layer on one side of the core layer which was made from a TPO/impact copolymer (Chisso Newcon NF-2106), an optic improving layer exterior to the separable layer (Fina 3355Z), a sealing layer on each surface, the first sealing layer exterior to the optic improving layer made of Chisso XPM 7702, and the second sealing layer made of Chisso XPM 7510.

Film 1

Core Layer: propylene homopolymer (Fina 3355Z), 85 gauge

Separable Layer: TPO/impact copolymer (Chisso Newcon NF-2106), 4 gauge

Optic Improving Layer propylene homopolymer (Fina 3371), 4 gauge

First Seal Layer: Chisso XPM 7702, 3 gauge, corona treated

Second Seal Layer Chisso XPM 7510, 3.5 gauge

Film sample surfaces comprising the Chisso XPM 7702 were sealed to themselves. When these seals were subjected to forces that could rupture the seals, the core layers maintained their integrity. Failure occurred within the separable layers, only.

Barrier Properties were WVTR: 0.37; $TO_2$: 110.1

Optical Properties were Haze: 1.8%; Gloss: 88.1%

The construction was subsequently replicated:

Film 2

Core Layer: propylene homopolymer (Fina 3355Z), 85 gauge

Separable Layer: TPO/impact copolymer (Chisso Newcon NF-2106), 4 gauge

Optic Improving Layer propylene homopolymer (Fina 3371), 4 gauge

First Seal Layer: Chisso XPM 7702, 4 gauge, corona treated

Second Seal Layer Chisso XPM 7510, 3.5 gauge

Film sample surfaces comprising the Chisso XPM 7702 were sealed to themselves. When these seals were subjected to forces that could rupture the seals, the core layers maintained their integrity. Failure occurred within the separable layers, only.

Barrier Properties were WVTR: 0.41; $TO_2$: 107.8

Optical Properties were Haze: 1.9%; Gloss: 87.2%

A control film was produced without the optic improving layer:

Film 3

Core Layer: propylene homopolymer (Fina 3355Z)

Intermediate Layer: TPO/impact copolymer (Chisso Newcon NF-2106), 50 gauge

Seal Layers: ethylene-propylene-butene-1 terpolymer (Montell EP5C39F), 6 gauge

Optical Properties were Haze: 9.8%; Gloss: 56.1%

What is claimed is:

1. A sealable film comprising:

(a) a core layer comprising an olefin polymer wherein the core layer comprises an interior of the film;

(b) a separable layer exterior to the core layer, wherein the separable layer comprises a material or blend selected from the group consisting of impact copolymers, thermoplastic polyolefins, block copolymers, blends of impact copolymers and LLDPE's, blends of two or more incompatible polymers, and mixtures thereof;

(c) an optic improving layer exterior to both the core layer and the separable layer, wherein the optic improving layer comprises a polymer having at least one of modulus, hardness, and beam strength being higher than to material of the separable layer; and (d) a sealing layer exterior to the core layer, the separable layer, and the optic improving layer, wherein the sealing layer comprises a polymer.

2. The sealable film of claim 1 wherein the olefin polymer of the core layer comprises a material selected from the group consisting of isotactic polypropylene, syndiotactic polypropylene, high density polyethylene, medium density polyethylene, low density polyethylene, linear low density polyethylene, ethylene-propylene random copolymers, ethylene-propylene block copolymers, and mixtures thereof.

3. The sealable film of claim 2 wherein the olefin polymer of the core layer comprises greater than about 80 wt. % of a material selected from the group consisting of isotactic polypropylene and syndiotactic polypropylene based on the entire weight of the core layer.

4. The sealable film of claim 1 wherein the polymer of the optic improving layer is selected from the group consisting of isotactic polypropylene, syndiotactic polypropylene and mixtures thereof; density polyethylene, medium density polyethylene, liner low density polyethylene, medium density polyethylene, and mixtures thereof; metallocene-catalyzed polypropylene, metallocene-catalyzed polyethylene, metallocene-catalyzed polyethylene plastomer, and mixtures thereof.

5. The sealable film of claim 1 in which the sealing layer is selected from the group consisting of ethylene-propylene random copolymer, ethylene-butene-1 copolymer, ethylene-propylene-butene-1 terpolymer, propylene-butene copolymer, low density polyethylene, linear low density polyethylene, very low density polyethylene, metallocene-catalyzed polymers known by the term plastomer, ethylene-hexene copolymer, ethylene-butene copolymer, ethylene-octene copolymer, ethylene-methacrylic acid copolymer, ethylene-vinyl acetate copolymer, ionomer resin, and mixtures thereof.

6. The sealable film of claim 1 wherein the film further comprises a coating applied to a surface of the sealing layer, the coating selected from the group consisting of acrylic, polyvinylidene chloride, ethylene-acrylic acid copolymer, and mixtures thereof.

7. The sealable film of claim 1 in which the blends of two or more incompatible copolymers of the separable layer is selected from the group consisting of (a) linear low density polyethylene and polypropylene; (b) high density polyethylene and polypropylene; (c) low density polyethylene and polypropylene; (d) metallocene catalyzed plastomer ethylene-hexene-butene terpolymer and polypropylene; (e) tear low density polyethylene and ethylene-propylene block copolymer; and mixtures thereof; (f) metallocene catalyzed polyethylene; (g) metallocene catalyzed polypropylene; (h) ethylene homopolymer, (i) ethylene copolymer; (j) ethylene terpolymer; and mixtures thereof.

8. The sealable film of claim 1, further comprising another sealing layer on a side of the core layer opposite the separable layer.

9. The sealable film of claim 8, wherein the another sealing layer is selected from the group consisting of ethylene-propylene random copolymer, ethylene-butene-1 copolymer, ethylene-propylene-butene-1 terpolymer, propylene-butene copolymer, low density polyethylene, linear low density polyethylene, very low density polyethylene, metallocene-catalyzed polymers known by the term plastomer, ethylene-hexene copolymer, ethylene-butene copolymer, ethylene-octene copolymer, ethylene-methacrylic acid copolymer, ethylene-vinyl acetate copolymer, ionomer resin, and mixtures thereof.

10. The scalable film of claim 1 wherein the film thither comprises a coating applied to a surface of the sealing layer, the coating selected from the group consisting of acrylic, polyvinylidene chloride, ethylene-acrylic acid copolymer, and mixtures thereof.

11. A sealable film comprising:

(a) a core layer comprising an olefin polymer;

(b) a separable layer on an exterior side of the core layer, wherein the separable layer comprises a material or blend selected from the group consisting of impact copolymers, thermoplastic polyolefins, block copolymers, blends of impact copolymers and LLDPE's, blends of two or more incompatible polymers, and mixtures thereof;

(c) an optic improving layer exterior to both the core layer and the separable layer, wherein the optic improving layer comprises a polymer having at least one of modulus, hardness, and beam strength being higher than the material of the separable layer, and (d) a sealing layer comprising a polymer.

12. The sealable film of claim 11, wherein the sealing layer is exterior to the core layer the separable layer, and the optic improving layer.

13. The sealable film of claim 11, wherein the sealing layer is on a side of the core layer opposite the separable layer and the optic improving layer.

14. The scalable film of claim 11, further comprising another sealing layer on a side of the core layer opposite the sealing layer.

15. The sealable film of claim 14, wherein the film further comprises a coating applied to a surface of the another scaling layer, the coating selected from the group consisting of acrylic polyvinylidene chloride, ethylene-acrylic acid copolymer, and mixtures thereof.

16. The sealable film of claim 11 wherein the olefin polymer of the core layer comprises a material selected from the group consisting of isotactic polypropylene, syndiotactic polypropylene, high density polyethylene, medium density polyethylene, low density polyethylene, linear low density polyethylene ethylene-propylene random copolymers, ethylene-propylene block copolymers, and mixtures thereof.

17. The sealable film of claim 16, wherein the olefin polymer of the core layer comprises greater than about 80 wt. % of a material selected from the group consisting of isotactic polypropylene and syndiotactic polypropylene based on the entire weight of the core layer.

18. The sealable film of claim 11, wherein the polymer of the optic improving layer is selected from the group consisting of isotactic polypropylene, syndiotactic polypropylene, and mixture thereof; low density polyethylene, high density polyethylene, linear low density polyethylene, medium density polyethylene, and mixtures thereof.

19. The sealable film of claim 11, in which the sealing layer is selected from the group consisting of ethylene-propylene random copolymer, ethylene-butene-1 copolymer, ethylene-propylene-butene-1 terpolymer, propylene-butene copolymer, low density polyethylene, linear low density polyethylene, very low density polyethylene, matellocene-catalyzed polymers known by the term plastomer, ethylene-hexene copolymer, ethylene-butane copolymer, ethylene-octane copolymer, ethylene-methacrylic acid copolymer, ethylene-vinyl acetate copolymer, ionomer resin, and mixtures thereof.

20. The sealable film of claim 11, in which the blends of two or more incompatible copolymers of the separable layer is selected from the group consisting of (a) linear low density polyethylene and polypropylene; (b) high density polyethylene and polypropylene; (c) low density polyethylene and polypropylene; (d) metallocene catalyzed plastomer ethylene-hexene-butene terpolymer and polypropylene; (e) linear low density polyethylene and ethylene-propylene block copolymer; and mixtures thereof; (f) metallocene catalyzed polyethylene; (g) metallocene catalyzed polypropylene; (h) ethylene homopolymer; (i) ethylene copolymer; (j) ethylene terpolymer; and mixtures thereof.

* * * * *